United States Patent
Natanzon (10) Patent No.: US 12,367,316 B2
(45) Date of Patent: Jul. 22, 2025

(54) DATA STORAGE ARRANGEMENT AND METHOD FOR ANONYMIZATION AWARE DIFFERENTIAL COMPRESSION

(71) Applicant: HUAWEI TECHNOLOGIES CO., LTD., Guangdong (CN)

(72) Inventor: Assaf Natanzon, Hod Hasharon (IL)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 18/307,445

(22) Filed: Apr. 26, 2023

(65) Prior Publication Data

US 2023/0259655 A1 Aug. 17, 2023

Related U.S. Application Data

(63) Continuation of application No. PCT/EP2020/080576, filed on Oct. 30, 2020.

(51) Int. Cl.
*G06F 21/62* (2013.01)
*G06F 3/06* (2006.01)
*H03M 7/30* (2006.01)

(52) U.S. Cl.
CPC ........ *G06F 21/6254* (2013.01); *G06F 3/0619* (2013.01); *G06F 3/0658* (2013.01); *G06F 3/0673* (2013.01); *H03M 7/3066* (2013.01)

(58) Field of Classification Search
None
See application file for complete search history.

(56) References Cited

U.S. PATENT DOCUMENTS

| | | | |
|---|---|---|---|
| 9,338,220 B1* | 5/2016 | Kothari | G06F 21/6254 |
| 9,413,526 B1* | 8/2016 | Kothari | H04L 63/0421 |
| 9,432,342 B1* | 8/2016 | Kothari | H04L 63/0435 |
| 9,619,482 B1* | 4/2017 | Kothari | H04L 9/085 |
| 9,887,834 B1* | 2/2018 | Molaro | G06F 3/0608 |
| 2016/0342608 A1* | 11/2016 | Burshteyn | G06F 16/122 |
| 2017/0331796 A1* | 11/2017 | Crofton | H04L 67/1097 |
| 2018/0060612 A1* | 3/2018 | Gladwin | G06F 21/85 |
| 2019/0379394 A1 | 12/2019 | Hallak et al. | |

FOREIGN PATENT DOCUMENTS

WO 2019212866 A1 11/2019

OTHER PUBLICATIONS

Rousse et al., "Class-Aware Similarity Hashing for Data Classification," Springer, Advances in Digital Forensics IV, Chapter 9, Jan. 28, 2008, 13 pages.

* cited by examiner

Primary Examiner — Jeffrey R Swearingen
(74) Attorney, Agent, or Firm — Fish & Richardson P.C.

(57) ABSTRACT

An example data storage device includes a memory and a controller. The controller is configured to store at least one of the one or more data elements utilizing differential compression. The controller is further configured to receive a data element to be stored, generate a copy of the data element to be stored, and mask data to be anonymized by deleting one or more portions to be anonymized. The controller is further configured to generate similarity hashes for one or more portions of the copy of the data element with masked data for finding one or more reference portions, and compress the data element to be stored utilizing differential compression with reference to the one or more reference portions.

18 Claims, 3 Drawing Sheets

DATA STORAGE ARRANGEMENT AND METHOD FOR ANONYMIZATION AWARE DIFFERENTIAL COMPRESSION

CROSS-REFERENCE TO RELATED APPLICATIONS

This application is a continuation of International Application No. PCT/EP2020/080576, filed on Oct. 30, 2020. The disclosure of the aforementioned application is hereby incorporated by reference in its entirety.

TECHNICAL FIELD

The present disclosure relates generally to the field of data protection and backup; and more specifically, to data storage arrangements and methods for anonymization aware differential compression.

BACKGROUND

Typically, data backup is used to protect and recover data in an event of data loss in a primary storage system. Examples of the event of data loss may include, but is not limited to, data corruption, hardware or software failure in the primary storage system, accidental deletion of data, hacking, or malicious attack. Thus, for safety reasons, a separate backup system or a secondary storage (for example a data storage arrangement) is extensively used to store a backup of the data present in the primary storage system.

Currently, data anonymization is used to protect privacy of confidential or private information such as credit card numbers, social security number. In data anonymization, the confidential or personal data, such as person identifiable information, is often obfuscated so that the people who are associated with the data remain anonymous. However, it is observed that data anonymization manifests an adverse impact on the effectiveness of deduplication and differential deduplication, as anonymization may change multiple fields in the data. As a result of which a conventional similarity hashing function may not identify similar data portions and thereby differential compression may not be efficiently executed. Differential compression refers to identification of similarity between new blocks of data of new data and blocks of data that are previously stored and further storing of only non-identical blocks of data in a compressed form. In an example, a similarity hash value is generated and stored for each of the new blocks of data. Thereafter, similarity hash value of the new blocks of data is compared with similarity hash value of blocks of data previously stored. Thus, part of one block may be identical to a part of another block, and overall the new data is similar but not identical to previously stored data. Thus, only the non-identical part of a block of new data is stored and a pointer is used for that part of a similar block which is identical to part of the previously stored block. During anonymization, large pieces of the data may be modified (for example at every 100 bytes) and as conventional differential compression uses generic similarity functions which are not aware of data changes that may occur, the similar blocks (i.e. duplicate blocks) may not be identified. As a result, with time more storage space of the secondary storages become occupied as duplicate data may be stored which occupy a large storage space in the conventional secondary storages. This is undesirable as it causes reduction in performance of the secondary storages. Moreover, the cost of data storage, with all the associated costs including cost of storage hardware, continues to be a burden.

Therefore, in light of the foregoing discussion, there exists a need to overcome the aforementioned drawbacks associated with conventional data storage systems and methods of differential compression.

SUMMARY

The present disclosure seeks to provide a data storage arrangement and a method for anonymization aware differential compression. The present disclosure seeks to provide a solution to the existing problem of inefficient differential compression associated with data anonymization. An aim of the present disclosure is to provide a solution that overcomes at least partially the problems encountered in prior art, and provide an improved data storage arrangement and method that takes in account data anonymization during differential compression (i.e. an anonymization aware differential compression), which enables an efficient and improved differential compression even in the presence of anonymized data.

The object of the present disclosure is achieved by the solutions provided in the enclosed independent claims. Advantageous implementations of the present disclosure are further defined in the dependent claims.

In one aspect, the present disclosure provides a data storage arrangement comprising a memory and a controller, the memory being configured to store one or more data elements, and the controller being configured to store at least one of the one or more data elements utilizing differential compression wherein a similarity hash for a first portion of a data element is generated and compared to a stored similarity hash for a second portion, and if the similarity hashes match, the first portion is compressed with reference to the second portion, wherein the data storage arrangement comprising the controller is further configured to: receive a data element to be stored; generate a copy of the data element to be stored; mask data to be anonymized in the copy of data element to be stored by deleting one or more portions to be anonymized; generate similarity hashes for one or more portions of the copy of the data element with masked data for finding one or more reference portions; and compress the data element to be stored utilizing differential compression with reference to the one or more reference portions.

The data storage arrangement of the present disclosure takes into account data anonymization during differential compression (i.e. an anonymization aware differential compression), which enables an efficient compression and storage even in the presence of anonymized data. The present disclosure enables determining the similarity hashes by ignoring locations (i.e. by deleting) of the one or more portions to be anonymized. Thus, a probability of the similarity hashes to be similar to the similarity hashes of portions of data previously stored (such as reference portions) is improved in comparison to conventional storages where similarity hashes are calculated for portions of data including the data to be anonymized. In other words, after removing data fields that change during the anonymization, data blocks become more similar, and all the identical data is usually consecutive in the block (after the removal of the data from the data fields that change during the anonymization most of the remaining data is identical). This means that similarity hashes are found to be identical with much higher probability. This results in finding more similar blocks and as a consequence achieving higher differential compression ratios. That is differential compression is efficiently executed by the present disclosure. Moreover, the present disclosure efficiently utilizes the storage space as in the anonymization aware differential compression, duplicate data is not stored, thereby improving system performance in comparison to conventional storages where large amount of storage space is occupied by duplicate data, which further affects system performance of conventional storages.

In an implementation form, the one or more data elements are one or more data blocks and wherein the controller is further configured to store the one or more data elements utilizing block storage.

The use of block storage for storing the one or more data elements as one or more data blocks enables in efficient data retrieval from the storage and recovery of the one or more data elements, when needed.

In a further implementation form, the controller is further configured to receive an indication on what data is to be anonymized, wherein the indication relates to one or more of local legislative requirements, personal information, and/or faces.

By virtue of the indication of what data is to be anonymized, the controller is configured to mask and further delete the data to be anonymized in the data that is received by the controller. As a result, a probability of similarity hashes of the data received to be similar to the similarity hashes of reference portions is improved. Thus, differential compression is efficiently executed.

In a further implementation form, the controller is further configured to parse the data to be anonymized.

The one or more data portions to be anonymized is parsed to enable efficient differential compression of the data element that is received by the controller for storing in comparison to conventional technologies where the data portions to be anonymized are not parsed from the data elements, and thus differential compression is inefficient.

In a further implementation form, the indication on what data is to be anonymized further relates to one or more locations of the data in the data element.

By virtue of the one or more locations of the data to be anonymized in the data element received, the data to be anonymized is easily identified. As a result, data to be anonymized is efficiently masked.

In a further implementation form, the indication on what data is to be anonymized is received via user input.

The user input enables customizable selection of which data to be anonymized based on user preference and need.

In a further implementation form, the indication on what data is to be anonymized is received along with the data element to be stored.

The receiving of indication of what data is to be anonymized along with data element to be stored enables to efficiently mask the data to be anonymized in the data element received for storing.

In a further implementation form, the controller is further configured to mask the data to be anonymized when generating the copy of the data element to be stored through a write-with-mask command.

The write-with-mask command enables in efficient masking of the data by providing information, such as type of data, size of data, data structure of the data. The write-with-mask refers to an IO write command that hints to the data storage arrangement (i.e. to storage) on areas or portions of the data element which may be modified during data anonymization.

In a further implementation form, the controller is further configured to delete the copy of the data element to be stored.

The copy of the data element is not stored by the controller. Thus, storage space is saved, which further enhances system performance of the data storage arrangement.

In a further implementation form, the controller is further configured to store the compressed data element in the memory.

The compressed data element is stored in the memory or in a remote memory. As the data element is stored in compressed form less storage space is used and thereby system performance is improved.

In another aspect, the present disclosure provides a method for a data storage arrangement comprising a memory being configured to store a one or more data elements, the method comprising storing at least one of the one or more data elements utilizing differential compression wherein a similarity hash for a first portion of a data element is generated and compared to a stored similarity hash for a second portion, and if the similarity hashes match, the first portion is compressed with reference to the second portion, wherein the method is characterized in that the method further comprises: receiving a data element to be stored; generating a copy of the data element to be stored; masking data to be anonymized in the copy of data element to be stored by deleting one or more portions to be anonymized; generating similarity hashes for one or more portions of the copy of the data element with masked data for finding one or more reference portions; and compressing the data element to be stored utilizing differential compression with reference to the one or more reference portions.

The method of the present disclosure takes in account data anonymization during differential compression (i.e. an anonymization aware differential compression), which enables an efficient compression and storage even in the presence of anonymized data. The method enables determining the similarity hashes by ignoring locations (i.e. by deleting) of the one or more portions to be anonymized. Thus, a probability of the similarity hashes to be similar to the similarity hashes of portions of data previously stored (such as reference portions) is improved in comparison to conventional methods where similarity hashes are calculated for portions of data including the data to be anonymized. In other words, after removing data fields that change during the anonymization, data blocks become more similar. This results in finding more similar blocks and as a consequence achieving higher differential compression ratios. That is differential compression is efficiently executed by the method of the present disclosure.

In another aspect, the present disclosure provides a computer-readable medium carrying computer instructions that when loaded into and executed by a controller of a data storage arrangement enables the data storage arrangement to implement the method of the previous aspect.

The computer-readable medium of the present disclosure takes in account data anonymization during differential compression (i.e. an anonymization aware differential compression), which enables an efficient compression and storage even in the presence of anonymized data. The computer-readable medium enables determining the similarity hashes by ignoring locations (i.e. by deleting) of the one or more portions to be anonymized. Thus, a probability of the similarity hashes to be similar to the similarity hashes of portions of data previously stored (such as reference portions) is improved.

In another aspect, the present disclosure provides a data storage arrangement comprising a memory being configured to store a one or more data elements, and the data storage arrangement further comprising a compression software module for compressing least one of the one or more data elements utilizing differential compression wherein a similarity hash for a first portion of a data element is generated and compared to a stored similarity hash for a second portion, and if the similarity hashes match, the first portion is compressed with reference to the second portion, wherein the data storage arrangement is characterized in that the data storage arrangement further comprises: a data element receiving software module for receiving a data element to be stored; a copy software module for generating a copy of the data element to be stored; a masking software module for masking data to be anonymized in the copy of data element to be stored by deleting one or more portions to be anonymized; a hash generating software module for generating similarity hashes for one or more portions of the copy of the data element with masked data for finding one or more reference portions; and the compression software module for compressing the data element to be stored utilizing differential compression with reference to the one or more reference portions.

The data storage arrangement by use of software modules takes in account data anonymization during differential compression (i.e. an anonymization aware differential compression), which enables an efficient compression and storage even in the presence of anonymized data. The software modules enable determining the similarity hashes by ignoring locations (i.e. by deleting) of the one or more portions to be anonymized. Thus, a probability of the similarity hashes to be similar to the similarity hashes of portions of data previously stored (such as reference portions) is improved in comparison to conventional storages where similarity hashes are calculated for portions of data including the data to be anonymized. As a result, higher differential compression ratios are achieved.

In another aspect, the present disclosure provides a computer-readable medium carrying a data storage comprising a plurality of data elements, wherein one or more of the plurality of data elements are stored utilizing the method of the previous aspect.

The computer-readable medium of the present disclosure takes in account data anonymization during differential compression (i.e. an anonymization aware differential compression), which enables an efficient compression and storage even in the presence of anonymized data. The computer-readable medium enables determining the similarity hashes by ignoring locations (i.e. by deleting) of the one or more portions to be anonymized. Thus, a probability of the similarity hashes to be similar to the similarity hashes of portions of data previously stored (such as reference portions) is improved.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
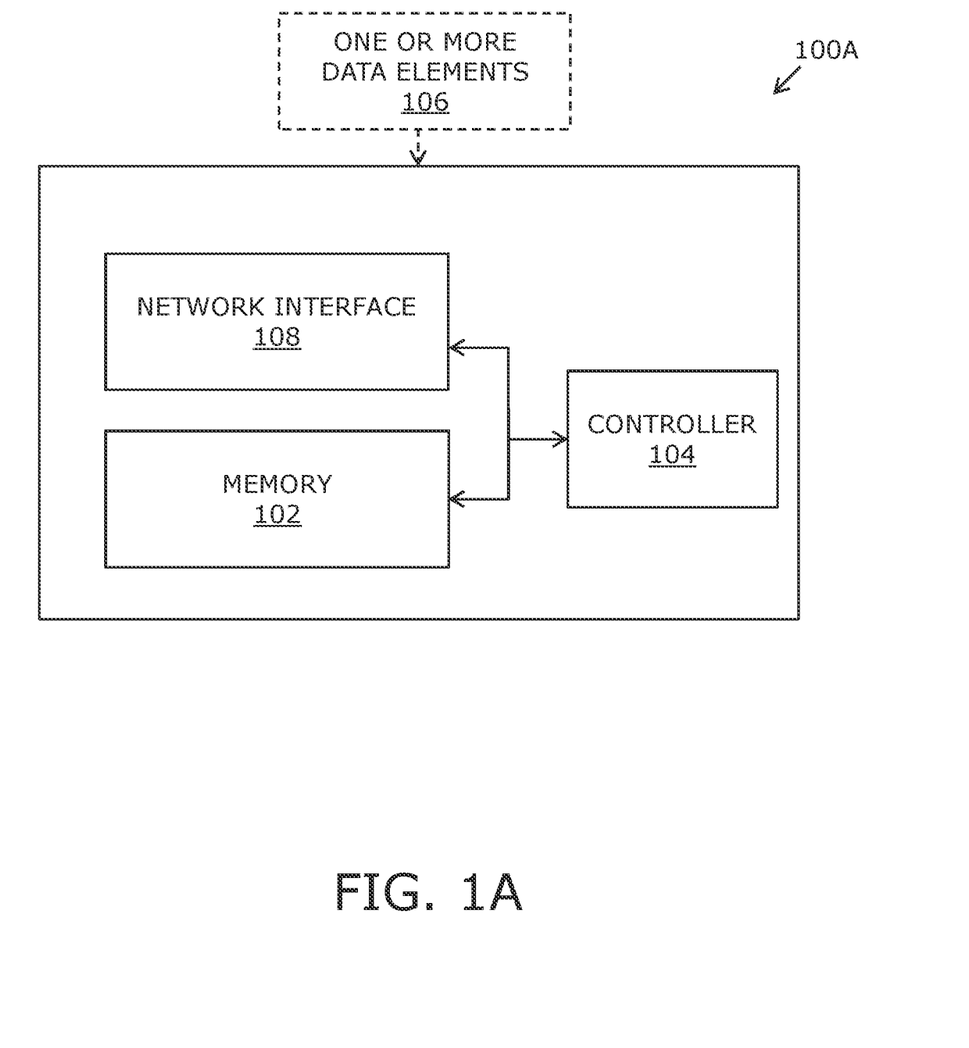
FIG. 1A is a block diagram of a data storage arrangement for anonymization aware differential compression, in accordance with an embodiment of the present disclosure.

FIG. 1A is a block diagram of a data storage arrangement, in accordance with an embodiment of the present disclosure. With reference to FIG. 1A there is shown a data storage arrangement 100A. The data storage arrangement 100A includes a memory 102 and a controller 104. The memory 102 is configured to store one or more data elements 106. In an implementation, the data storage arrangement 100A further includes a network interface 108.

In one aspect, the present disclosure provides a data storage arrangement 100A comprising a memory 102 and a controller 104, the memory 102 being configured to store one or more data elements 106, and the controller 104 being configured to store at least one of the one or more data elements 106 utilizing differential compression wherein a similarity hash for a first portion of a data element is generated and compared to a stored similarity hash for a second portion, and if the similarity hashes match, the first portion is compressed with reference to the second portion, wherein the data storage arrangement 100A that comprises the controller 104 is further configured to: receive a data element to be stored; generate a copy of the data element to be stored; mask data to be anonymized in the copy of data element to be stored by deleting one or more portions to be anonymized; generate similarity hashes for one or more portions of the copy of the data element with masked data for finding one or more reference portions; and compress the data element to be stored utilizing differential compression with reference to the one or more reference portions.

The data storage arrangement 100A includes the memory 102 being configured to store one or more data elements 106. The memory 102 refers to a hardware storage of the data storage arrangement 100A. The memory 102 includes suitable logic, circuitry, or interfaces that is configured to store one or more data elements 106, pointers and other data based on instructions received from the controller 104. Moreover, the memory 102 may be configured to further store instructions executable by the controller 104. Examples of implementation of the memory 102 may include, but are not limited to, Electrically Erasable Programmable Read-Only Memory (EEPROM), Random Access Memory (RAM), Read Only Memory (ROM), Hard Disk Drive (HDD), Flash memory, Solid-State Drive (SSD), and/or CPU cache memory. The memory 102 may store an operating system and/or other program products (including one or more operation algorithms) to operate the data storage arrangement 100A.

The one or more data elements 106 refers to incoming information or data stream that arrive at the data storage arrangement 100A. For example, the one or more data elements 106 may arrive as an input/output (I/O) request during differential compression process (i.e. when backup is performed from a primary storage system (e.g. a host server) to a secondary storage system, such as the data storage arrangement 100A. In an example, the one or more data elements 106 potentially includes personal data, such as personal identifiable data or data that may be subject to data privacy and security under various regulations or data protection laws, such as Data Protection Act (DPA). The one or more data elements 106 may be a structured data, such as with defined fields, such as name, age, phone number, credit card number, address and the like. For example, the one or more data elements 106 may include a string of characters as "Dani, 33, 0541111111, 4580800080001999, A street" representing fields name, age, phone number, credit card number, and address fields in a sequence. In another example, the one or more data elements 106 may be unstructured data where the data that needs to be anonymized may appear at any place in data set without specific field or known location.

The network interface 108 includes suitable logic, circuitry, and/or interfaces that may be configured to communicate with one or more external devices, such as user devices or servers. Examples of the network interface 108 may include, but is not limited to, a network interface card (NIC), an antenna, a radio frequency (RF) transceiver, or network ports.

In an implementation, the controller 104 is configured to execute instructions stored in the memory 102. In an example, the controller 104 may be a general-purpose processor. Examples of the controller 104 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry. Moreover, the controller 104 may refer to one or more individual processors, processing devices, a processing unit that is part of a machine, such as the data storage arrangement 100A.

The controller 104 is configured to store at least one of the one or more data elements 106 utilizing differential compression wherein a similarity hash for a first portion of a data element is generated and compared to a stored similarity hash for a second portion, and if the similarity hashes match, the first portion is compressed with reference to the second portion. Differential compression refers to finding similar portions of data element (such as first portion) and compressing a similar portion (first portion) using another portion (second portion) as reference. Differential compression may also be referred to as similarity compression. Differential compression enables much better compression as similar portion of data element is already present. In other words, differential compression enables the controller 104 to store portions of data element that have matching hashes in a compressed form to execute data deduplication to save storage space. The controller 104 is configured to generate the hash (may also be referred to as similarity hash digest) for the first portion of data element using a hashing algorithm. Moreover, hashing algorithm is used for all portions of data elements previously stored to enable detection of duplicate portions of any data element that is to be stored in the data storage arrangement 100A. Further, if the hash of the first portion of data element is identical to the stored hash of the second portion previously stored in the data storage arrangement 100A then the first portion of data element is identified as a duplicate data portion and then first portion is compressed with reference to the second portion. In other words, the similarity hashes are calculated on portions of the data in a smart way, where identical similarity hashes indicate data is similar not identical, (i.e. there are some identical portions). As a result, the storage space is significantly reduced compared to conventional systems and methods. In an example, the compression of the first portion with reference to second portion may be executed using compression algorithms known in the art.

In an example, the controller 104 calculates hash digest and similarity hash digests for the first portion of data element. Hash digest simply refers to hash value of the first portion and similarity hash digest is a hash that indicates similarity of the data that is not identical, in many cases similarity hashes are calculated on portions of the data, for example min hash, wherein the data is divided into pieces and hash is calculated for each piece and the minimum of all hashes is kept; in the present disclosure the anonymized part of data is removed and then similarity hash is calculated on the rest of the data. If the controller 104 identifies another data portion (such as second portion) with the same similarity hash digests, the controller 104 may compress the first portion with the second portion as a reference. In other words, data other than data to be anonymized or data that is already anonymized, is same for both the first portion and the second portion. As a result, a large amount of storage space is saved which further improves system performance of the data storage arrangement 100A.

According to an embodiment, the one or more data elements 106 are one or more data blocks and wherein the controller 104 is further configured to store the one or more data elements 106 utilizing block storage. The use of block storage for storing the one or more data blocks enables in efficient data retrieval from the storage and recovery of the one or more data elements 106, when needed. The one or more data elements may be stored as fixed sized blocks (i.e. fixed size chunks). In an example, a basic block size may be 8 Kilobytes, that means all inputs and outputs of the data elements must be aligned to 8 Kilobytes offset and of size which is a multiple or not multiple of 8 Kilobytes (i.e. 24 Kilobytes, 40 Kilobytes, 128 Kilobytes and the like). The one or more data elements 106 are multiples of the basic block size i.e. 8 kB, 16, 24, 32 kB and the like, and offset is also multiple of 8 kB.

The controller 104 is further configured to receive a data element to be stored. The data element (e.g. an I/O write request) to be stored may be received from the memory 102 or from a remote data source. The data element to be stored may be received by the controller 104 from an external device that is communicatively coupled to the data storage arrangement 100A via the network interface 108. The data storage arrangement 100A may be a host storage). In an example, the data storage arrangement 100A is configured to store data of a plurality of user devices or host server in an organization. In an example, the data element may be received at the time of backup to perform deduplication. The data element corresponds to the one or more data elements 106.

In an example, the data element (before anonymization) to be stored that is received by the controller 104 is given below in table (1). It is to be understood that in practice, there may be millions of rows or large number of columns stored in tabular form in a database.

TABLE 1

| Name | Age | Phone Number | Credit Card Number | Address |
| --- | --- | --- | --- | --- |
| James | 22 | 0531000000 | 4580800080001231 | C street |
| Dani | 33 | 0541111111 | 4580800080001999 | A street |
| Josef | 55 | 0541222222 | 4580123434001999 | B street |
| Sam | 77 | 0546234223 | 4580234981273041 | D street | wherein name is of 64 characters, age is of 3 characters, phone number is of 10 characters, credit card number is of 16 characters, address of 64 characters. In another example, the data element to be stored that is received by the controller 104 is an alphanumeric character string: James, 22, 0531000000, 4580800080001231, C street, Dani, 33, 0541111111, 4580800080001999, A street, Josef, 55, 0541222222, 4580123434001999, B street, Sam, 77, 0546234223, 4580234981273041, D street.

In another example, the data element (after anonymization) to be stored that is received by the controller 104 is given below in table (2). It is to be understood that in practice, there may be millions of rows or large number of columns stored in tabular form in a database.

TABLE 2

| Name | Age | Phone Number | Credit Card Number | Address |
| --- | --- | --- | --- | --- |
| James | 22 | 0531000000 | 1000000000000000 | C street |
| Dani | 33 | 0541111111 | 1000000000000000 | A street |
| Josef | 55 | 0541222222 | 1000000000000000 | B street |
| Sam | 77 | 0546234223 | 1000000000000000 | D street | wherein name is of 64 characters, age is of 3 characters, phone number is of 10 characters, credit card number is of 16 characters, address of 64 characters. In another example, the data element to be stored that is received by the controller 104 is an alphanumeric character string: James, 22, 0531000000, 1000000000000000, C street, Dani, 33, 0541111111, 1000000000000000, A street, Josef, 55, 0541222222, 1000000000000000, B street, Sam, 77, 0546234223, 1000000000000000, D street.

The table (1) and table (2) in the aforesaid example are identical except the credit card numbers, but since the width of the table is just 157 characters, in many conventional cases similarity hashes may fail to find blocks of 8 KB which will include 52 such entries (16 from each table) as similar since they are different in so many locations as conventional similarity hashes usually calculate hashes on for data larger than 200 bytes. However, the data storage arrangement 100A of the present disclosure, masks out (i.e. by removal) the data to be anonymized (i.e. the credit card number) by deletion and as a result, similarity hashes of the present disclosure have identical similarity hash values in comparison to conventional similarity hashes. Thus, differential compression is efficiently implemented by the data storage arrangement 100A of the present disclosure and further has high compression ratios.

The controller 104 is further configured to generate a copy of the data element to be stored. The copy of the one or more data portions to be store is generated to enable the controller 104 to mask the data to be anonymized from the rest of the data element received by the controller 104. In an example, the copy of the data element to be stored is generated based on a start offset and an end offset of the data element. In an example, in the data element received by the controller 104, the start offset is '1' and end offset is '224' and thus a copy of the data element is generated based on the start and end offset generated. The copy of the data element to be stored may be a virtual copy (e.g. for temporary processing purpose) of the data element without actually fully copying the data element.

The controller 104 is further configured to mask data to be anonymized in the copy of data element to be stored by deleting one or more portions to be anonymized. By virtue of masking the data to be anonymized by deleting one or more portions, similarity hashes can be calculated by ignoring and by removing the locations in the copy of data element which may be anonymized. In other words, the data to be anonymized is masked by deleting one or more portions to enable identification of the data portions to be anonymized among all the data portions in the copy of data element. As a result of which differential compression can be easily executed by the data storage arrangement 100A. In comparison to some conventional techniques where the similarity hashes become different due to the anonymized portions of data that make the data chunks appear different. Thereby, such conventional techniques are not able to execute differential compression efficiently. In contradiction to conventional systems, after removing data fields that change during the anonymization, data blocks become more similar, and all the identical data is usually consecutive in the blocks (e.g. after the removal of the data from the data fields that change during the anonymization most of the remaining data may be identical). This means that similarity hashes are found to be identical with much higher probability. This results in finding more similar blocks and as a consequence enables achieving higher differential compression ratios.

According to an embodiment, the controller 104 is further configured to receive an indication on what data is to be anonymized, wherein the indication relates to one or more of local legislative requirements, personal information, and/or faces. The indication on what data is to be anonymized may configure which section of data is to anonymized such as General Data Protection Regulation (GDPR) requirement based anonymization, anonymize just credit cards, facial information (e.g. images of facial portions), medical information, or person identifiable data, and the like as per need. The indication may define which columns in a table (of the data element received) include sensitive data, which may be anonymized, or the controller 104 may use automatic tool to identify such fields. Further based on the indication the controller 104 may mask the data to be anonymized.

According to an embodiment, the controller 104 is further configured to parse the data to be anonymized. In other words, a parser finds up all parts of the block which may be anonymized, for example the parser can identify credit card numbers. Algorithms for detection of sensitive data may be used which work based on the indication on what data is to be anonymized. For example, in a case where the data element is a structured data, in which a location of a given data field is predefined or known, it is parsed accordingly. For instance, in the data element received by the controller 104, credit card numbers data field is identified at start offset '67' and end offset '224' from the start of the alphanumeric character string. In another example, patterns may be used based on user configurations and rules to identify the one or more data portions (e.g. sensitive data) to be anonymized. Beneficially, the one or more data portions to be anonymized is parsed by the controller 104 to enable efficient differential compression of the data element that is received by the controller 104 for storing. In conventional technologies where the data portions to be anonymized are not parsed from the data elements, and thus differential compression is inefficient.

According to an embodiment, the indication on what data is to be anonymized further relates to one or more locations of the data in the data element. In other words, based on the one or more locations of the data in the data element, the indication on what data is to be anonymized is obtained. In an example, a start offset, and an end offset may indicate the one or more locations of the data that is to be anonymized. In another example, data given by location for example in a table, makes sure location is described based on column of the table indicating type of the data to be anonymized.

According to an embodiment, the indication on what data is to be anonymized is received via user input. In other words, anonymization setting is received via user input. The user input may be provided via a remote source coupled to the data storage arrangement 100A. In an example, a user may configure via user input which anonymization may occur to the data. In other words, the user may configure which section of data is to anonymized such as General Data Protection Regulation (GDPR) anonymization, anonymize just credit cards and the like as per need. The user may define which columns in a table (of the data element received) include sensitive data, which may be anonymized.

In an example, the controller 104 may be configured to receive the user input that is an indication to which setting or configuration to select for masking data. Such settings and configurations which are selected or configured may be prestored in the memory 102.

According to an embodiment, the indication on what data is to be anonymized is received along with the data element to be stored. In other words, anonymization setting is received along with the one or more data blocks. As a result of which customized or desired anonymization may be executed on the data element to be stored.

According to an embodiment, the controller 104 is further configured to mask the data to be anonymized when generating the copy of the data element to be stored through a write-with-mask command. In an example, the controller 104 is configured to provide the write-with-mask command to the memory 102. The memory 102 upon receiving the command may use the mask to improve differential compression. The write-with-mask refers to a new IO write command that hints to the data storage arrangement 100A on areas or portions of the data element which may be modified during data anonymization. In an example, the write-with-mask command is represented by function (1) that is shown below.

$$\text{WriteWithMask}(\text{Data},\text{device},\text{offset},\text{size},\text{dataMask}) \quad (1)$$

wherein
'Data' refers to the data to be written;
'device' refers to the device where the data is written, it can be a file, or a Logical Unit (LU);
'offset' refers to the offset where the data is written (i.e. in the file or the LU);
'size' refers to the size of the data, which is typically a multiple of 512 bytes for block devices;
'dataMask' refers to a data structure describing which parts of the data may be changed during anonymization.

The controller 104 is further configured to generate similarity hashes for one or more portions of the copy of the data element with masked data for finding one or more reference portions. The similarity hashes are generated to enable identification of one or more portions which have large piece of data which are identical and thereby share the one or more similarity hashes. Thus, by the use of one portion as a reference to compress the other portions, a high compression ratio is obtained, resulting in high data reduction ratios. In an example, similarity hashes such as minhash is generated for one or more portions of the copy of the data element. Similarity hash may also be referred to as the similarity hash digest.

The controller 104 is further configured to compress the data element to be stored utilizing differential compression with reference to the one or more reference portions. If the similarity hash digests that is generated for one or more portions of the copy of data element with masked data is same as the similarity hash digests for one or more portions (i.e. reference portions) already stored, then the data element is compressed with the previous data used as reference. As a result, storage space of the memory 102 is saved which further increases efficiency of the data storage arrangement 100A. Beneficially, compression ratios are high due to the similarity of the portions.

According to an embodiment, the controller 104 is further configured to store the compressed data element in the memory 102. The compressed data element may be stored at predefined storage spaces in the memory 102. In an example, the compressed data element may be stored in an encrypted form. In this case, the storage (e.g. the memory 102) refers to a block storage array, and the compressed data element may be stored at same site of the host.

In an example, a first data element (before anonymization) that is received for storing is represented by a first sequence as 'C street (64 bytes), Dani (64 bytes), 33 (3 bytes), 0541111111 (10 bytes), 4580800080001999 (16 bytes), A street (64 bytes), Josef (64 bytes), 55 (3 bytes), 0541222222 (10 bytes), 4580123434001999 (16 bytes), B street (64 bytes)'. Further, a copy of the first data element is generated and data to be anonymized is masked in the copy of data element. In this example, credit card numbers are identified and masked by deleting from the copy of the first data element. A striped first sequence is represented as 'C street (64 bytes), Dani (64 bytes), 33 (3 bytes), 0541111111 (10 bytes), A street (64 bytes), Josef (64 bytes), 55 (3 bytes), 0541222222 (10 bytes), B street (64 bytes)'. Data in first sequence which is potentially anonymized is represented as '4580800080001999, 4580123434001999'. In another example, a second data element (after anonymization and also slightly different alignment) that is received for storing is represented by a second sequence as 'Dani (64 bytes), 33 (3 bytes), 0541111111 (10 bytes), 1000000000000000 (12 bytes), A street (64 bytes), Josef (64 bytes), 55 (3 bytes), 0541222222 (10 bytes), 1000000000000000 (12 bytes), B street (64 bytes), Sam (64 bytes)'. Further, a copy of the second data element is generated and data to be anonymized is masked in the copy of data element. In this example, credit card numbers are identified and masked by deleting from the copy of the second data element. A striped second sequence is represented as 'Dani (64 bytes), 33 (3 bytes), 0541111111 (10 bytes), A street (64 bytes), Josef (64 bytes), 55 (3 bytes), 0541222222 (10 bytes), B street (64 bytes), Sam (64 bytes)'. Data in second sequence which is potentially anonymized is represented as '1000000000000000 (offset 67), 1000000000000000 (offset 220)'. Based on the examples, after the removal of the data to be anonymized, the first striped sequence and second striped sequence are still not identical, since the sequence start in different offset of the table. It is seen that after the removal of the data to be anonymized, most of the remaining data in the first striped sequence and the second striped sequence is identical (just starts at different offset). After removal of the data to be anonymized, the first sequence and the second sequence become more similar, and all the identical data is consecutive in the sequence. Thus, the similarity hashes for the first striped sequence and the second striped sequence is identical with much higher probability. This results in finding more similar blocks and getting higher differential compression ratios.

Figure 1B:
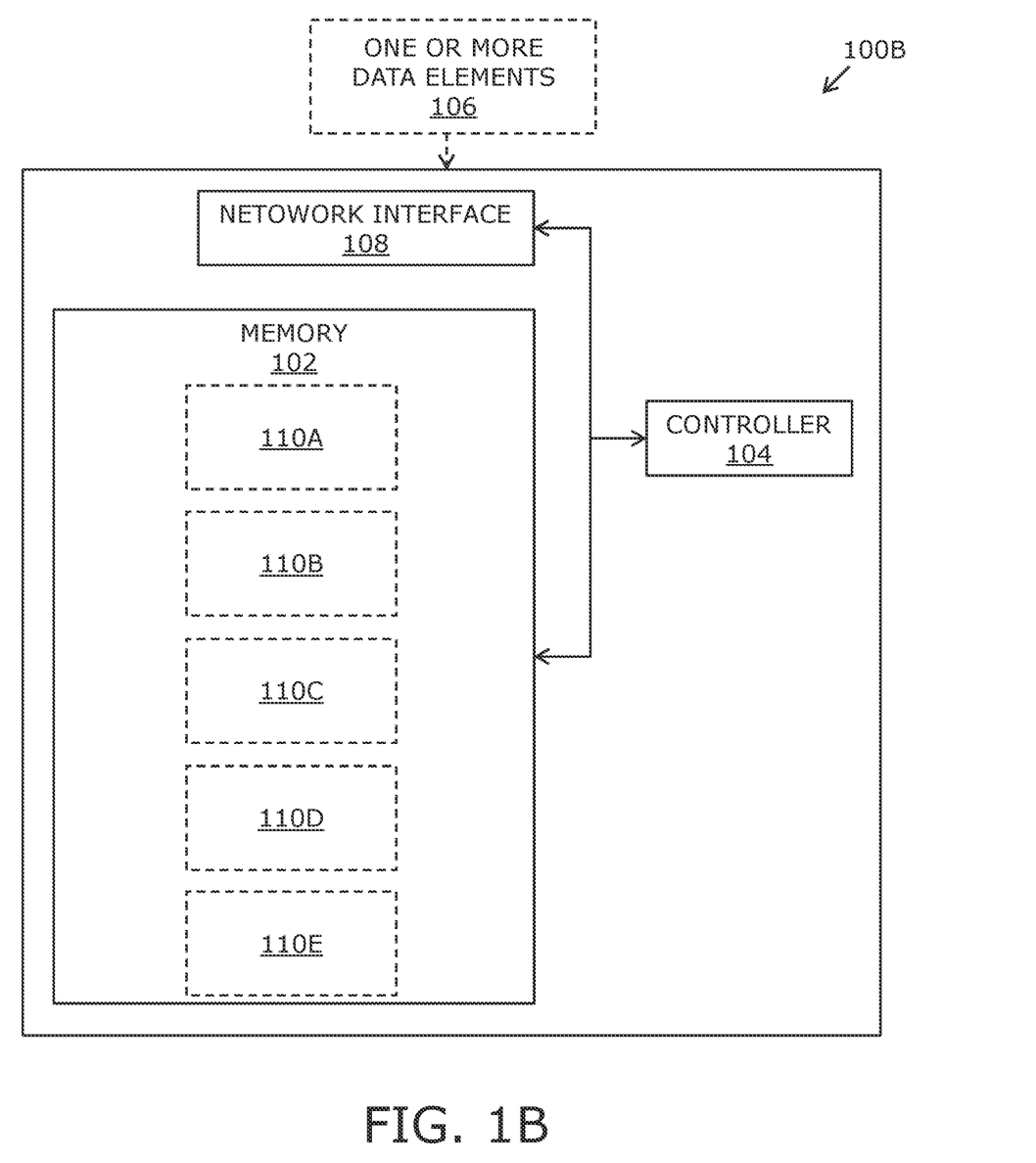
FIG. 1B is a block diagram of a data storage arrangement for anonymization aware differential compression, in accordance with another embodiment of the present disclosure.

FIG. 1B is a block diagram of a data storage arrangement, in accordance with another embodiment of the present disclosure. With reference to FIG. 1B there is shown a data storage arrangement 100B. The data storage arrangement 100B further includes a compression software module 110A, data element receiving software module 110B, copy software module 110C, masking software module 110D, and hash generating software module 110E that are installed in the memory 102. There is further shown the controller 104 and the network interface 108.

In another aspect the present disclosure provides a data storage arrangement 100B comprising a memory 102 being configured to store a one or more data elements 106, and the data storage arrangement 100B further comprising a compression software module 110A for compressing least one of the one or more data elements 106 utilizing differential compression wherein a similarity hash for a first portion of a data element is generated and compared to a stored similarity hash for a second portion, and if the similarity hashes match, the first portion is compressed with reference to the second portion, wherein the data storage arrangement 100B is characterized in that the data storage arrangement 100B further comprises: a data element receiving software module 110B for receiving a data element to be stored; a copy software module 110C for generating a copy of the data element to be stored; a masking software module 110D for masking data to be anonymized in the copy of data element to be stored by deleting one or more portions to be anonymized; a hash generating software module 110E for generating similarity hashes for one or more portions of the copy of the data element with masked data for finding one or more reference portions; and the compression software module 110A for compressing the data element to be stored utilizing differential compression with reference to the one or more reference portions.

The data storage arrangement 100B further comprises the data element receiving software module 110B, which when executed by the controller 104, receives a data element to be stored. The data element to be stored may be received from memory 102 when the software module 110B is executed by the controller 104.

The data storage arrangement 100B further comprises the copy software module 110C, which when executed by the controller 104, generates a copy of the data element to be stored. The copy of the one or more data portions to be store is generated when the software module 110C is executed by the controller 104 to enable the controller 104 to mask the data to be anonymized by removing such data from the rest of the data element received by the controller 104.

The data storage arrangement 100B further comprises the masking software module 110D, which when executed by the controller 104, masks data to be anonymized in the copy of data element to be stored by deleting one or more portions to be anonymized. By virtue of masking the data to be anonymized by deleting one or more portions, similarity hashes may be calculated by ignoring and by removing the locations in the copy of data element which may be anonymized. In other words, the data to be anonymized is masked by deleting one or more portions, by the masking software module 110D, to enable identification of the data portions to be anonymized among all the data portions in the copy of data element. As a result of which differential compression can be easily executed by the data storage arrangement 100B.

The data storage arrangement 100B further comprises the hash generating software module 110E, which when executed by the controller 104, generates similarity hashes for one or more portions of the copy of the data element with masked data for finding one or more reference portions. The similarity hashes are generated to enable identification of one or more portions which have large piece of data which are identical and thereby share the one or more similarity hashes. Thus, by the use of one portion as a reference to compress the other portions, a high compression ratio is obtained, resulting in high data reduction ratios.

The data storage arrangement 100B further comprises the compression software module 110A, which when executed by the controller 104, compresses the data element to be stored utilizing differential compression with reference to the one or more reference portions. If the similarity hash digests that is generated for one or more portions of the copy of data element with masked data is same as the similarity hash digests for one or more portions (i.e. reference portions) already stored, then the data element is compressed.

As a result, storage space of the memory 102 is saved which further increases efficiency of the data storage arrangement 100B.

Figure 2:
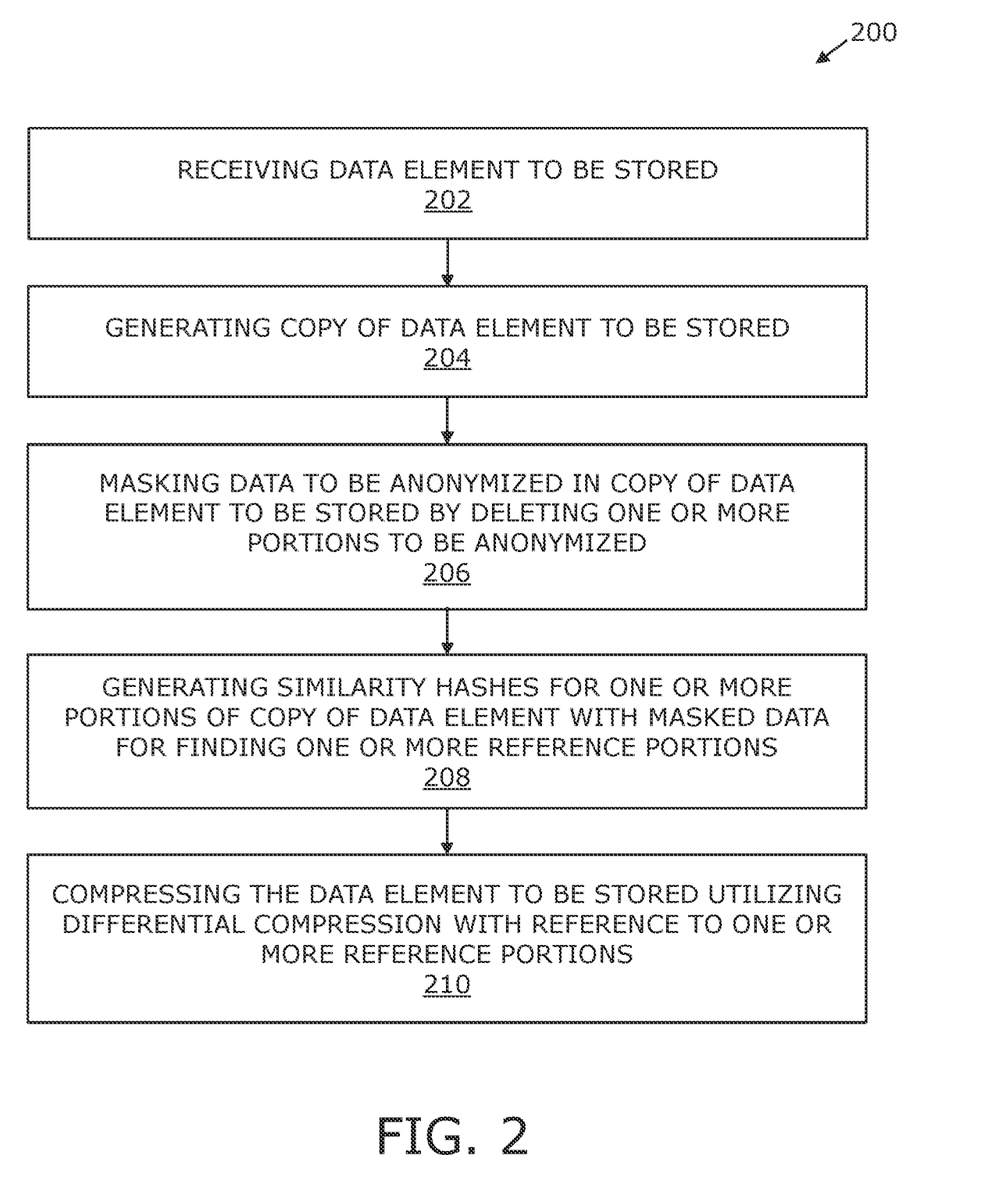
FIG. 2 is a flowchart of a method for a data storage arrangement for anonymization aware differential compression, in accordance with an embodiment of the present disclosure.

FIG. 2 is a flowchart of a method for a data storage arrangement, in accordance with an embodiment of the present disclosure. The method 200 is executed at a data storage arrangement (e.g. the data storage arrangement 100A or 100B) described, for example, in FIGS. 1A and 1B. The method 200 includes steps 202 to 210.

In one aspect the present disclosure provides a method 200 for a data storage arrangement (e.g. the data storage arrangement 100A or 100B) comprising a memory 102 being configured to store a one or more data elements 106, the method 200 comprising storing at least one of the one or more data elements 106 utilizing differential compression wherein a similarity hash for a first portion of a data element is generated and compared to a stored similarity hash for a second portion, and if the similarity hashes match, the first portion is compressed with reference to the second portion, wherein the method 200 is characterized in that the method 200 further comprises: receiving a data element to be stored; generating a copy of the data element to be stored; masking data to be anonymized in the copy of data element to be stored by deleting one or more portions to be anonymized; generating similarity hashes for one or more portions of the copy of the data element with masked data for finding one or more reference portions; and compressing the data element to be stored utilizing differential compression with reference to the one or more reference portions.

At step 202, the method 200 comprises receiving a data element to be stored. The data element to be stored may be received by the controller 104 from the memory 102. The data element to be stored may be received by the controller 104 from an external device that is communicatively coupled to the data storage arrangement (e.g. the data storage arrangement 100A or 100B) via the network interface 108.

At step 204, the method 200 further comprises generating a copy of the data element to be stored. The copy of the one or more data portions to be store is generated by the controller 104 to enable masking the data to be anonymized from the rest of the data element received by the controller 104. The copy of the data element can be a virtual copy without actually copying the data.

At step 206, the method 200 further comprises masking data to be anonymized in the copy of data element to be stored by deleting one or more portions to be anonymized. By virtue of masking data to be anonymized by deleting one or more portions, similarity hashes may be calculated by ignoring and by removing the locations in the copy of data element which may be anonymized. As a result of which differential compression can be easily executed by the data storage arrangement (e.g. the data storage arrangement 100A or 100B).

According to an embodiment, the method 200 further comprises receiving an indication on what data is to be anonymized, wherein the indication relates to one or more of local legislative requirements, personal information, and/or faces. The indication on what data is to be anonymized may configure which section of data is to anonymized such as General Data Protection Regulation (GDPR) anonymization, anonymize personal and confidential financial data, such as credit cards, person identifiable information (such as images of facial portion or other personal information) and the like as per need.

According to an embodiment, the method 200 further comprises parsing the data to be anonymized. In other words, a parser finds up all parts of the block which may be anonymized, for example the parser can identify credit card numbers. Beneficially, the one or more data portions to be anonymized is parsed by the controller 104 to enable efficient differential compression of the data element that is received by the controller 104 for storing.

According to an embodiment, the method 200 further comprises masking the data to be anonymized when generating the copy of the data element to be stored through a write-with-mask command. In an example, the controller 104 is configured to provide the write-with-mask command to the memory 102. The memory 102 upon receiving the command may use the mask to improve differential compression.

At step 208, the method 200 further comprises generating similarity hashes for one or more portions of the copy of the data element with masked data for finding one or more reference portions. The similarity hashes are generated to enable identification of one or more portions which have large piece of data which are identical and thereby share the one or more similarity hashes. Thus, by the use of one portion as a reference to compress the other portions, a high compression ratio is obtained, resulting in high data reduction ratios.

At step 210, the method 200 further comprises compressing the data element to be stored utilizing differential compression with reference to the one or more reference portions. If the similarity hash digests that is generated for one or more portions of the copy of data element with masked data is same as the similarity hash digests for one or more portions (i.e. reference portions) already stored, then the data element is compressed. As a result, storage space of the memory 102 is saved which further increases efficiency of the data storage arrangement (e.g. the data storage arrangement 100A or 100B).

According to an embodiment, the method 200 further comprises storing the compressed data element in the memory 102. The compressed data element may be stored at predefined storage spaces in the memory 102 based on the remote source or host from which the data to be stored is received. The compressed data element may also be stored at a remote storage.

According to an embodiment, the method 200 further comprises deleting the copy of the data element to be stored. The copy of the masked data element is not stored by the controller 104. As a result of which storage space is saved and further enhances performance of the data storage arrangement (e.g. data storage arrangement 100A or 100B).

In one aspect, provided is a computer-readable medium carrying computer instructions that when loaded into and executed by a controller 104 of a data storage arrangement (e.g. data storage arrangement 100A or 100B) enables the data storage arrangement to implement the method 200. In another aspect, provided is a computer-readable medium carrying a data storage comprising a plurality of data elements, wherein one or more of the plurality of data elements are stored utilizing the method 200. Examples of implementation of the computer-readable medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. In yet another aspect, a computer program product is provided comprising a non-transitory computer-readable storage medium having computer program code stored thereon, the computer program code being executable by a processor to execute the method 200. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A data storage device comprising a memory and a controller, wherein:
    the memory is configured to store one or more data elements, and
    the controller is configured to:
        store at least one of the one or more data elements utilizing differential compression, wherein a similarity hash for a first portion of a first data element is generated and compared to a stored similarity hash for a second portion of the first data element, and wherein when the similarity hash for the first portion of the first data element matches the stored similarity hash for the second portion of the first data element, the first portion is compressed with reference to the second portion;
        receive a second data element to be stored, wherein the second data element is different than the first data element;
        generate a copy of the second data element to be stored;
        mask data to be anonymized in the copy of the second data element to be stored by deleting one or more portions to be anonymized;
        generate similarity hashes for one or more portions of the copy of the second data element with masked data for finding one or more reference portions; and
        generating a compressed second data element by compressing the second data element to be stored utilizing differential compression with reference to the one or more reference portions.

2. The data storage device according to claim 1, wherein the one or more data elements are one or more data blocks, and wherein the controller is further configured to store the one or more data elements utilizing block storage.

3. The data storage device according to claim 1, wherein the controller is further configured to receive an indication of data to be anonymized, wherein the indication relates to one or more of local legislative requirements, personal information, or faces.

4. The data storage device according to claim 3, wherein the controller is further configured to parse the data to be anonymized.

5. The data storage device according to claim 3, wherein the indication of the data to be anonymized further relates to one or more locations of the data to be anonymized in the second data element to be stored.

6. The data storage device according to claim 3, wherein the indication of the data to be anonymized is received via user input.

7. The data storage device according to claim 3, wherein the indication of the data to be anonymized is received along with the second data element to be stored.

8. The data storage device according to claim 1, wherein the controller is further configured to mask the data to be anonymized when generating the copy of the second data element to be stored through a write-with-mask command.

9. The data storage device according to claim 1, wherein the controller is further configured to store the compressed second data element in the memory.

10. A method applied to a data storage device comprising a memory configured to store one or more data elements, the method comprising:
    storing at least one of the one or more data elements utilizing differential compression, wherein a similarity hash for a first portion of a first data element is generated and compared to a stored similarity hash for a second portion of the first data element, and wherein when the similarity hash for the first portion of the first data element matches the stored similarity hash for the second portion of the first data element, the first portion is compressed with reference to the second portion;
    receiving a second data element to be stored, wherein the second data element is different than the first data element;
    generating a copy of the second data element to be stored;
    masking data to be anonymized in the copy of the second data element to be stored by deleting one or more portions to be anonymized;
    generating similarity hashes for one or more portions of the copy of the second data element with masked data for finding one or more reference portions; and
    generating a compressed second data element by compressing the second data element to be stored utilizing differential compression with reference to the one or more reference portions.

11. The method according to claim 10, wherein the method further comprises:
    storing the one or more data elements utilizing block storage.

12. The method according to claim 10, wherein the method further comprises:
    receiving an indication of data to be anonymized, wherein the indication relates to one or more of local legislative requirements, personal information, or faces.

13. The method according to claim 12, wherein the method further comprises:
    parsing the data to be anonymized.

14. The method according to claim 12, wherein the indication of data to be anonymized further relates to one or more locations of the data to be anonymized in the second data element to be stored.

15. The method according to claim 12, wherein the indication of the data to be anonymized is received via user input.

16. The method according to claim 12, wherein the indication of the data to be anonymized is received along with the second data element to be stored.

17. The method according to claim 10, wherein the method further comprises:
   masking the data to be anonymized when generating the copy of the second data element to be stored through a write-with-mask command.

18. The method according to claim 10, wherein the method further comprises:
   storing the compressed second data element in the memory.

* * * * *